United States Patent [19]

Noren

[11] Patent Number: 4,501,855
[45] Date of Patent: Feb. 26, 1985

[54] COMB CATIONIC POLYMERS AND AQUEOUS DISPERSIONS THEREOF

[75] Inventor: Gerry K. Noren, Hoffman Estates, Ill.

[73] Assignee: DeSoto, Inc., Des Plaines, Ill.

[21] Appl. No.: 316,960

[22] Filed: Oct. 29, 1981

[51] Int. Cl.³ .............................................. C08L 33/26
[52] U.S. Cl. ................................... 525/218; 525/221; 525/230; 525/911; 525/916; 523/406; 523/411
[58] Field of Search ............... 525/119, 230, 911, 917, 525/218, 221, 916; 523/406, 411

[56] References Cited

U.S. PATENT DOCUMENTS

| | | | |
|---|---|---|---|
| 3,617,458 | 11/1971 | Brockman | 525/119 |
| 3,766,156 | 10/1973 | Kine et al. | 525/230 |
| 3,892,819 | 7/1975 | Najvar | 525/119 |
| 3,947,396 | 3/1976 | Kangas et al. | 523/411 |
| 4,129,610 | 12/1978 | Kobayashi | 525/119 |

Primary Examiner—John C. Bleutge
Assistant Examiner—Robert Sellers
Attorney, Agent, or Firm—Dressler, Goldsmith, Shore, Sutker & Milnamow, Ltd.

[57] ABSTRACT

Comb cationic polymers are disclosed which are constituted by amine polymers rendered cationic and water dispersible with the aid of a solubilizing acid. The amine polymers are the product of reaction of: (1) a soluble polymer having an average molecular weight in the range of about 500 to about 10,000 and having a plurality of functional groups reactive with carboxyl or amine functionality (such as epoxy groups as supplied by an epoxidized polybutadiene); with (2) a solution addition copolymer of monoethylenically unsaturated monomers containing copolymerized tertiary amine monomer. The copolymer is terminated with a single carboxy group or a single amino hydrogen atom, and it is free of reactive groups capable of reacting with the functional groups of the soluble polymer, except for the single carboxyl group or the single amino hydrogen atom. The products are particularly useful in cationic electrocoating where they provide improved stability and better Coulombic efficiency.

14 Claims, No Drawings

COMB CATIONIC POLYMERS AND AQUEOUS DISPERSIONS THEREOF

DESCRIPTION

1. Technical Field

This invention relates to amine polymers having a unique comb structure which provides superior dispersibility in water with the aid of a solubilizing acid which renders the polymer cationic. These comb cationic polymers possess superior Coulombic efficiency when deposited electrically from aqueous dispersion onto the cathode of a unidirectional electrical system.

2. Background Art

Amine polymers of various type have been provided and dispersed in water with the aid of a solubilizing acid, but these have encountered problems when used in cationic electrocoating. First, the aqueous dispersions have poor stability at a close to neutral pH, and electrocoating baths based on these dispersions degrade with time. Second, the Coulombic efficiency is less than desired, so more electricity is consumed in the electrocoating operation. It is desired to provide new amine-functional polymers which would minimize these disadvantages.

DISCLOSURE OF INVENTION

In accordance with this invention, an amine polymer which is rendered cationic and water dispersible or water soluble with the aid of a solubilizing acid, is formed by the reaction of: (1) a solvent-soluble polymer having an average molecular weight in the range of about 500 to about 10,000 and having a plurality of functional groups reactive with carboxyl or amino hydrogen functionality; with (2) a solution addition copolymer of monoethylenically unsaturated monomers containing copolymerized tertiary amine monomer, this copolymer being terminated with a single carboxyl group or a single amino hydrogen atom. Solution addition copolymers having an average molecular weight of about 3,000 to about 30,000 can be used, and an average molecular weight of 4,000 to 12,000 is preferred. The copolymer must be free of reactive groups capable of reacting with the functional groups of the soluble polymer, except for the single carboxyl group or the single amino hydrogen atom referred to previously.

The preferred solvent-soluble polymers are epoxidized polydienes. The preferred diene is butadiene which forms liquid unsaturated polymers and copolymers which can be epoxidized in known fashion. Epoxidized butadiene-styrene copolymers containing from 5% to 50% by weight of copolymerized styrene are particularly preferred and will be used in the examples. The preferred soluble polymers have a molecular weight of 1,000 to 5,000.

The preferred soluble amine copolymers will contain from 4% to 25% by weight of copolymerized tertiary amine monomer. Tertiary amine monomers are required to prevent undesired side reactions. These are desirably amino alkyl derivatives of a monoethylenically unsaturated carboxylic acid or an amide thereof. Dimethyl aminoethyl methacrylate is quite suitable. Other suitable tertiary amine monomers are illustrated by dimethyl aminopropyl methacrylate, dimethyl aminoethyl methacrylate, and the corresponding acrylates, crotonates, and the like. The amino amides are particularly suitable, as illustrated by dimethyl aminopropyl methacrylamide which will be used in the example.

The copolymerization in organic solvent solution may be carried out in largely conventional fashion using a water miscible organic solvent, moderate heat, and a free radical-generating polymerization catalyst, such as azobisisobutyronitrile, benzoyl peroxide or cumene hydroperoxide. The unusual feature of the copolymerization is the use of a chain terminating agent having a single carboxyl group, such as mercaptopropionic acid, or a single amino hydrogen atom, such as 3,4,5,6-tetrahydro-2-pyridine thiol or 6-mercaptopurine. While these chain-terminating agents are known for this purpose, they provide special advantage in the tertiary amine copolymers which are formed in this invention.

It is the chain terminating agent which provides the copolymer with its single carboxyl group or its single amino hydrogen atom. The single carboxyl group is preferred since chain terminating agents providing this group are more available. Chain terminating agents of the type under discussion and their employment in solution copolymerization are more fully disclosed in my prior copending application Ser. No. 2.5,009 filed Dec. 10, 1980, the disclosure of which is incorporated herein by reference. While thiopropionic acids are preferred, hydroxy acids, such as lactic acid, are also useful.

The solution addition copolymer also desirably includes from 5% to 20% by weight of an hydroxy monomer, such as 2-hydroxyethyl acrylate or methacrylate, which facilitates subsequent cure with a curing agent. The hydroxy groups do not react with the epoxy functionality in the linear polymer under the same conditions which permit reaction with the carboxyl group, and thus the hydroxy groups may be present in the solution copolymer because they do not react with the functional groups of the linear polymer. In some situation where the hydroxy groups become reactive, they could not be used.

The preferred curing agents are methylol-functional soluble resins, aminoplast resins being particularly preferred. Phenoplast resins and blocked isocyanate-functional curing agents are also suitable. These curing agents and their proportion of use are well known and are illustrated in the example. Broadly speaking, the curing agents are useful in amounts of from 5% to 50% of the weight of the copolymer-reactive polymer which is rendered cationic.

The reaction between the solution copolymer with its single carboxyl group or its single amino hydrogen atom and the epoxy-functional soluble polymer proceeds easily because it is a simple addition reaction. The reaction with carboxy normally requires the presence of an extraneous esterification catalyst which would introduce undesired ionic contamination into the product which would impair the electrocoating utility which is a primary objective of this invention. It is a feature of this invention that the reaction herein does not require an extraneous esterification catalyst because the tertiary amine groups in the copolymer provide this function.

It is preferred to employ an approximately stoichiometric proportion of the solution copolymer, based on its carboxy or amino hydrogen content, so that substantially all of the epoxy functionality in the reactive soluble polymer will be consumed. Unreacted epoxy functionality impairs stability in aqueous medium, but it can be tolerated to some extent in nonaqueous medium. Accordingly, while a stoichiometric balance is important for electrocoat utility, this invention more broadly employs at least about 10% of the solution copolymer based on the weight of the soluble polymer. Excess soluble polymer can also be tolerated, but properties are impaired as the excess increases. More particularly, stability problems are encountered, and there is a reduction in the Coulombic efficiency which is achieved.

The invention will be more fully understood from the illustration of preferred practice which follows, it being understood that all proportions herein are by weight, unless otherwise stated.

EXAMPLE 1

2-ethoxy ethanol (365.5 grams) and isopropanol (134.5 grams) were charged into a 3000 ml. 4-neck round bottom flask equipped with a heating mantle, thermometer, temperature controller, mechanical stirrer with Teflon blade, nitrogen sparge, reflux condenser, and 1000 ml. pressure equalizing addition funnel. The was mixture was then heated to 90° C. with stirring.

A monomer solution was made by adding dimethyl aminopropyl methacrylamide (300.0 grams), butyl acrylate (472.5 grams), styrene (337.5 grams), 2-hydroxyethyl acrylate (390 grams), 3-thiopropionic acid (22.5 grams) and azobisisobutyronitrile polymerization catalyst (25.0 grams) to a mixture of 2-ethoxy ethanol (365.5 grams) and isopropanol (134.5 grams).

This monomer solution was then slowly added over 5 hours to the heated solvents in the flask while maintaining the temperature at 100±5° C. When the addition of monomer solution is complete, two additions of 6.5 grams of the same polymerization catalyst dissolved in 50 ml of isopropanol were made one hour apart, the first addition being made one hour after completion of the monomer addition. The polymerizing mixture was maintained at 100° C. for twelve hours. The resulting polymer solution had a resin solids content of 57.5%, an amine content of 1.17 meq. of amine per gram of resin, and a carboxyl content of 0.17 meq. of carboxy per gram of resin.

EXAMPLE 2

100.0 grams of the carboxy-terminated amine copolymer solution of Example 1 containing 9.8 meq. of carboxy functionality and 2.6 grams of an epoxidized butadiene-styrene copolymer which was epoxidized with hydrogen peroxide and acetic acid to provide 4.92 meq. of epoxy functionality per gram of resin were charged into a 250 ml. 4-neck round bottom flask equipped with a mechanical stirrer having a Teflon blade, thermometer, temperature controller, nitrogen sparge, heating mantle and reflux condenser. The epoxidized butadiene copolymer had a resin solids content of 76.6% and provided 9.8 meq. of epoxy functionality. The commercial butadiene-styren copolymer Ricon-181 of Colorado Chemical Speciality Company can be used. The result, after refluxing at 95°–105° C. for 17 hours is an amine copolymer having a solids content of 64.6% and an amine content of 1.13 meq. of amine per gram of resin. The carboxy functionality and the epoxy functionality were substantially completely consumed by the reaction.

EXAMPLE 3

The solution product of Example 2 was mixed with hexamethoxymethyl melamine (American Cyanamide product Cymel 1130 may be used) to provide a resin mixture having a 70/30 weight ratio mixture of amine polymer to melamine resin. A solubilizing acid (dimethylol propionic acid) was then mixed in to provide enough acid to neutralize 50% of the amine functionality present in the amine polymer. Then, 3% by weight of an acid catalyst (di-2-ethylhexyl phosphoric acid) was added based on the total weight of resin present. This mixture was then diluted to 12% resin solids content with deionized water to provide an electrocoat bath. Two baths were made in this fashion. The first of these employed the amine copolymer of Example 1, and the second of these employed the product of Example 2 in which the amine copolymer had been reacted with the epoxidized linear polymer.

These baths were tested by electrocoating panels of cold rolled steel and the coated panels were baked at 150° C. for 20 minutes.

The bath made from the amine copolymer of Example 1 had a lower pH (4.9) than the bath of Example 2 (6.4), and hence is more corrosive. Both baths had about the same conductivity and the film hardness produced was also the same. However, the film thickness produced by electrodeposition for 90 seconds at 50 volts was markedly different even though the same maximum amperage of 1.0 amp was obtained in both cases. Thus, the bath of Example 1 deposited a film of only 0.16 mil in thickness and the bath of Example 2 provided a much thicker film (0.75 mil). The far superior Coulombic efficiency is self-evident.

The films deposited using the bath of Example 2 were also superior in that there were no pinholes as encountered in Example 1, adhesion was better, and the gloss was also better.

While it is possible to adjust the amine copolymer for better performance, these systems intrinsically lack superior bath stability and good Coulombic efficiency, as is achieved by this invention.

The preferred electrocoating baths of this invention have a resin solids content of from 4% to 20% and a pH of from 5.0 to 8.0, preferably from 5.5 to 7.0.

What is claimed is:

1. A comb cationic polymer constituted by an amine polymer rendered cationic and water dispersible with the aid of a solubilizing acid, said amine polymer being the product of reaction of: (1) a soluble reactive polymer having an average molecular weight in the range of about 500 to about 10,000 and having a plurality of functional groups reactive with carboxyl or amino hydrogen functionality; with (2) a solution addition copolymer of monoethylenically unsaturated monomers containing copolymerized tertiary amine monomer, said copolymer being terminated with a single carboxy group or a single amino hydrogen atom, and said copolymer being free of reactive groups capable of reacting with the functional groups of said soluble polymer, except for said single carboxyl group or single amino hydrogen atom, and said copolymer being used in an amount of at least 10% of the weight of said soluble polymer and being substantially completely reacted therewith.

2. A cationic polymer as recited in claim 1 in which said solution copolymer contains from 1% to 35% by weight of copolymerized tertiary amine monomer, and said plurality of reactive functional groups are epoxy groups.

3. A cationic polymer as recited in claim 2 in which said tertiary amine monomer is an amino alkyl derivative of a monoethylenically unsaturated carboxylic acid or an amide thereof present in an amount of from 4% to 25% of the weight of the copolymer.

4. A cationic polymer as recited in claim 1 in which said soluble polymer is an epoxidized polydiene.

5. A cationic polymer as recited in claim 1 in which said solution copolymer has an average molecular weight of about 3,000 to about 30,000.

6. A cationic polymer as recited in claim 5 in which said soluble polymer is an epoxidized butadiene-styrene copolymer containing from 5% to 50% of copolymerized styrene.

7. A cationic polymer as recited in claim 1 in which said solution copolymer includes from 5% to 20% of an hydroxy monomer.

8. A cationic polymer as recited in claim 7 in which said hydroxy monomer is 2-hydroxyethyl acrylate or methacrylate.

9. A cationic polymer as recited in claim 1 in which said solution copolymer is reacted in an approximately stoichiometric amount based on carboxyl in said copolymer to functionality reactive therewith in said soluble polymer.

10. A comb cationic polymer constituted by an amine polymer rendered cationic and water dispersible with the aid of a solubilizing acid, said amine polymer being the product of substantially complete reaction of approximately stoichiometric proportions of: (1) a soluble reactive polydiene polymer having an average molecular weight in the range of about 500 to about 10,000 and having a plurality of epoxy groups reactive with carboxyl functionality; with (2) a solution addition copolymer of monoethylenically unsaturated monomers containing from 1% to 35% by weight of copolymerized tertiary amine monomer, said copolymer having an average molecular weight of from 4,000 to 12,000 and being terminated with a single carboxyl group, said copolymer being free of reactive groups capable of reacting with the functional groups of said soluble polymer, except for said single carboxyl group.

11. A cationic polymer as recited in claim 10 in which said solution copolymer includes from 5% to 20% by weight of 2-hydroxyethyl acrylate or methacrylate.

12. A method of producing a cationic polymer comprising substantially completely reacting a soluble polymer having a plurality of epoxy groups with a solution addition copolymer of monoethylenically unsaturated monomers including from 1% to 35% by weight of tertiary amine monomer, said solution polymer and said solution copolymer being present in approximately stoichiometrically proportions based on a single carboxyl group terminating said copolymer and epoxy functionality in said soluble polymer, and using the tertiary amine functionality in the copolymer as the sole catalyst to promote the epoxy-carboxyl esterification reaction.

13. An aqueous dispersion comprising the cationic polymer of claim 1 dispersed in water with the aid of a solubilizing acid.

14. An electrocoating bath comprising the aqueous dispersion of claim 13 having a resin solids content of from 4% to 20% and a pH of from 5.0 to 8.0.

* * * * *

UNITED STATES PATENT AND TRADEMARK OFFICE
CERTIFICATE OF CORRECTION

PATENT NO. : 4,501,855
DATED : February 26, 1985
INVENTOR(S) : Gerry K. Noren

It is certified that error appears in the above-identified patent and that said Letters Patent is hereby corrected as shown below:

Column 2, line 23, change "2.5,009 to:  -- 215,009 --

Column 6, line 20, change "stoichiometrically" to:

-- stoichiometric --

*Signed and Sealed this*

*Eighteenth* Day of *June 1985*

[SEAL]

Attest:

DONALD J. QUIGG

*Attesting Officer*   *Acting Commissioner of Patents and Trademarks*